(12) United States Patent
Tullis

(10) Patent No.: US 6,516,131 B1
(45) Date of Patent: Feb. 4, 2003

(54) STRUCTURES AND METHODS FOR ALIGNING FIBERS

(76) Inventor: Barclay J. Tullis, 1795 Guinda St., Palo Alto, CA (US) 94303

( * ) Notice: Subject to any disclaimer, the term of this patent is extended or adjusted under 35 U.S.C. 154(b) by 0 days.

(21) Appl. No.: 09/825,821

(22) Filed: Apr. 4, 2001

(51) Int. Cl.[7] .................................................. G02B 6/00
(52) U.S. Cl. ........................................ 385/137; 385/65
(58) Field of Search ............................ 385/137, 30, 16, 385/24, 31, 39, 48, 147, 27, 89, 90, 97, 65

(56) References Cited

U.S. PATENT DOCUMENTS

| | | | |
|---|---|---|---|
| 4,475,790 A | 10/1984 | Little | 385/137 |
| 4,493,528 A | 1/1985 | Shaw | 385/30 |
| 4,536,058 A | 8/1985 | Shaw | 385/30 |
| 4,556,279 A | 12/1985 | Shaw | 385/30 |
| 4,564,262 A | 1/1986 | Shaw | 385/30 |
| 4,601,541 A | 7/1986 | Shaw | 385/30 |
| 4,682,848 A | 7/1987 | Cairns | 385/69 |
| 4,688,882 A | 8/1987 | Failes | 385/30 |
| 4,802,727 A | 2/1989 | Stanley | 385/89 |
| 4,919,510 A | 4/1990 | Hoke | 385/95 |
| 5,187,760 A | 2/1993 | Huber | 385/37 |
| 5,243,673 A * | 9/1993 | Johnson et al. | 385/55 |
| 5,351,331 A * | 9/1994 | Chun et al. | 156/158 |
| 5,400,426 A * | 3/1995 | de Jong et al. | 385/95 |
| 5,633,968 A | 5/1997 | Sheem | 385/53 |
| 5,659,647 A | 8/1997 | Kravitz | 385/52 |
| 5,781,675 A | 7/1998 | Tseng | 385/30 |
| 5,809,188 A | 9/1998 | Tseng | 385/37 |
| 5,810,968 A * | 9/1998 | Dannoux | 156/293 |
| 6,011,881 A | 1/2000 | Moslehi | 385/10 |

OTHER PUBLICATIONS

Huang et al. "MEMS Packaging for Micro Mirror Swiches" Proc. 48th Electronic Components & Technology Conference, Seattle, WA., May 1998, pp. 592–597.

* cited by examiner

Primary Examiner—Tulsidas Patel

(57) ABSTRACT

Presented are structures and methods by which to align fiber optics side-by-side or end-to-end; to align fiber optics to features in supporting substrates or to objects on supporting substrates; and to align substrates to one another. Alignment grooves are included with particular properties that permit the groove to participate in the moving of a fiber into alignment. A fiber is used in a tapered channel as an alignment key enabling accurate tuning of an optical coupling ratio and efficiency of fiber-optic side-polished couplers, multiplexers, taps, splitters, joiners, filters, modulators and switches. Substrates made of crystal are presented having variable-width grooves and in some cases also variable-depth grooves which form guiding and constraining pathways for fiber optics. The reader will readily appreciate the novel structures and methods applicable to realize manufacturable fiber optics to perform all-fiber photonic functions.

35 Claims, 9 Drawing Sheets

STRUCTURES AND METHODS FOR ALIGNING FIBERS

BACKGROUND OF THE INVENTION

This invention generally pertains to alignment and assembly methods for fiber optics with supporting substrates, and to fiber optic devices that are implemented with side-polished fiber optics.

There are no prior art methods and devices published, or on the market, for utilizing the precision of crystal structure (s) to achieve ultra-precise alignments of interacting side-polished fiber. What is known in the prior art deals with implementation of single-fibers that are side-polished to implement two-port photonic functions requiring no side-by-side critical alignment to other fibers. This known art is taught in the U.S. Pat. Nos. 5,809,188 "Tunable optical filter or reflector" and 5,781,675 "Method for preparing fiber-optic polarizer", both by Tseng. Tseng's patents teach the use of a variable-depth V-groove etched in a silicon crystal substrate to achieve both a) precise control of the remaining side-wall thickness left on a side-polished fiber and b) an arcuate path for the fiber which enables the side-polished region to be of a controlled length. Tseng teaches the use of silicon substrates with 100 crystal orientation at the surface to achieve superior precision in the control of remaining sidewall thickness. He does not teach methods or devices for facilitating the placement of a fiber into a groove of width comparable to the diameter of the fiber. He does not teach means by which to align two fibers end-to-end.

Earlier art teaches side-polished fiber optics made by retaining the fiber within a groove cut into the surface of a non-crystalline material such as glass or quartz. This art can be found in such U.S. Pat. Nos. as 4,493,528 "Fiber optic directional coupler", 4,536,058 "Method of manufacturing a fiber optic directional coupler", 4,556,279 "Passive fiber Optic Multiplexer", 4,564,262 "Fiber optic directional coupler", 4,601,541 "Fiber optic directional coupler", 6,011,881 "Fiber-optic tunable filter", all by Shaw. This art also teaches the requirement of one side-polished fiber along side of a second side-polished fiber, but fails to disclose any means of mechanical self-alignment.

Earlier art also includes devices and methods of aligning optical components using constant-depth V-grooves in the surfaces of silicon substrates. Three examples include U.S. Pat. Nos. 5,633,968 "Face-lock interconnection means for optical fibers and other optical components and manufacturing methods of the same" by Sheem, 4,475,790 "Fiber optic coupler" by Little, and 4,802,727 "Positioning optical components and waveguides" by Stanley. Another U.S. Pat. No. , 4,688,882 "Optical contact evanescent wave fiber optic coupler" by Failes, not only references some of the earliest work of constructing substrate-supported, side-polished, fiber-optic devices, but also describes some of the limitations involved. This patent by Failes teaches a method of achieving a fused coupling between side-coupled fibers that doesnt't require the index-matching coupling fluid of previous works. Failes did not offer any approaches to precisely and rigidly support the fibers through intimate contact with respective hard substrates.

Another relevant prior art is that of U.S. Pat. No. 5,187,760 "Wavelength selective coupler for high power optical communications" by Huber. This patent references little of the above prior art, and furthermore, to this inventor's opinion, seems to be what is called a "non-enabling" patent because it does not provide the reader with information on how to practically implement the structures described and claimed. It describes the use of gratings with which to couple light within a wavelength band between a first fiber and a second fiber. In fact it also describes doing this at more than a single location along the length of the second fiber, wherein the multiple first fibers have respective gratings with different wavelength bands. What is needed is a practicable way in which to implement such structures and devices successfully.

Additional prior art on positioning of fiber optics on substrates is found in the technology of Microelectronic Mechanical Systems (MEMS). One reference to such technology is that of "MEMS Packaging for Micro Mirror Switches", by L. S. Huang, S. S. Lee, E. Motamedi, M. C. Wu, and C. J. Kim, Proc. 48th Electronic Components & Technology Conference, Seattle, Wash., May 1998, pp. 592–597.

None of the above art teaches methods or devices for facilitating the placement of a fiber into a groove of width comparable to the diameter of the fiber. And none of the above prior art teaches methods or devices to facilitate bringing two fibers end-to-end using a common substrate. Straight and constant-width V-grooves are commonly used in prior-art fiber optic devices, assemblies, and products, but none provide devices and methods by which, in the first place, to facilitate bringing the fiber easily into alignment with these grooves. And fiber optic connectors are common in the prior art with which to bring two fibers into end-to-end alignment, but not using a common substrate and always involving numerous interrelating parts. For example, see U.S. Pat. No. 5,659,647 "Fiber alignment apparatus and method" by Kravitz, U.S. Pat. No. 4,919,510 "Optical connector and method" by Hoke, and U.S. Pat. No. 4,682,848 "Underwater-mateable optical fiber connector" by Cairns.

Practicable methods and devices are needed that manifest a) easy assembly of fibers into precision grooves in supporting substrates; b) easy co-alignment of two independent, precision substrates; and c) easy and precise alignment of fibers end-to-end or of a fiber to a planar waveguide.

Practicable methods and devices are needed that easily manifest precision alignment of fibers side-by-side, and with controlled positional tuning as necessary for fiber optic devices with three or more ports (such as fiber-optic couplers, add-drop multiplexers, taps, splitters, joiners, filters, modulators and switches).

What is also needed is a means to reduce the stress experienced by a fiber optic where it enters or leaves a substrate groove.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the methods and devices and combinations particularly pointed out in the appended claims.

The object of the invention is to provide new devices and methods by which to align fiber optics to one another, either side-by-side or end-to-end, or to features in supporting substrates (and devices or features on those substrates), and to align substrates to one another. It is also the object of the invention to provide devices that include alignment grooves having particular alignment-facilitating properties that participate in the moving of a fiber into an alignment groove. The object of the invention is also to include properties that may reduce stress to a fiber where it enters or leaves a supporting substrate. And the object of the invention is to provide facilitating means for using an alignment keying fiber to enable accurate tuning of optical coupling ratio and efficiency of 4-port devices (including 3-port devices) such as fiber-optic side-polished couplers, multiplexers, taps, splitters, joiners, filters, modulators and switches.

These and other objects of the invention are provided by a novel use tapered grooves in supporting substrates, and particularly in crystal substrates having variable-width grooves and in some cases also variable-depth grooves-which are fabricated by etching to form guiding and constraining pathways for fiber optics. The reader will readily appreciate the novel methods and structures used to realize manufacturable fiber optic (and planar optic) devices for performing needed all-fiber photonic functions. Some of the achievements of this invention include the following:

1. A uni-directionally or bi-directionally tapered V-groove for enabling easy positioning of fibers into a precision narrow groove.
2. A precise and microscopically small tapered channel for enabling easy insertion and positioning of a fiber into a precision narrow channel.
3. Substrates with tapered grooves leading to more narrow linear grooves for enabling a fiber to be used as a means of co-aligning a pair of these substrates over a common surface.
4. Substrates with tapered grooves on one surface (face) enabling a fiber to be used as a guide to precisely locate the face of one substrate to the face of another.
5. A bi-directionally tapered groove used for easy alignment of two fibers end-to-end.
6. Substrates with tapered grooves enabling a first fiber in a first substrate to be located end-to-end with a second fiber in an overlapping second substrate. This also allows for precise control of the rotation of the fibers relative to one another, such as when connecting polarization-maintaining fibers end-to-end.
7. Substrates as in 6 above but which also provide for the substrates to cover over the end-to-end fiber interconnection.
8. Method of adjusting interaction length and coupling-ratio in a 4-port side-polished fiber optic device (e.g. coupler or add-drop multiplexer) through the use of an easily positioned fiber as a sliding key in a parallel pair of face-to-face, uni-directionally or bi-directionally tapered grooves.
9. Terminations for fiber optic alignment grooves that provide for minimizing stress and strain at the entry and exit edges of the grooves.

BRIEF DESCRIPTION OF THE DRAWINGS

The accompanying drawings incorporated in and forming apart of the specification illustrate several aspects of the present invention, and together with the description serve to explain the principles of the invention. In the drawings:

FIG. 13 also shows how a varying width and depth groove can reduce stress in a fiber where it enters or leaves the groove.

DETAILED DESCRIPTION OF THE INVENTION

Figure 1A:
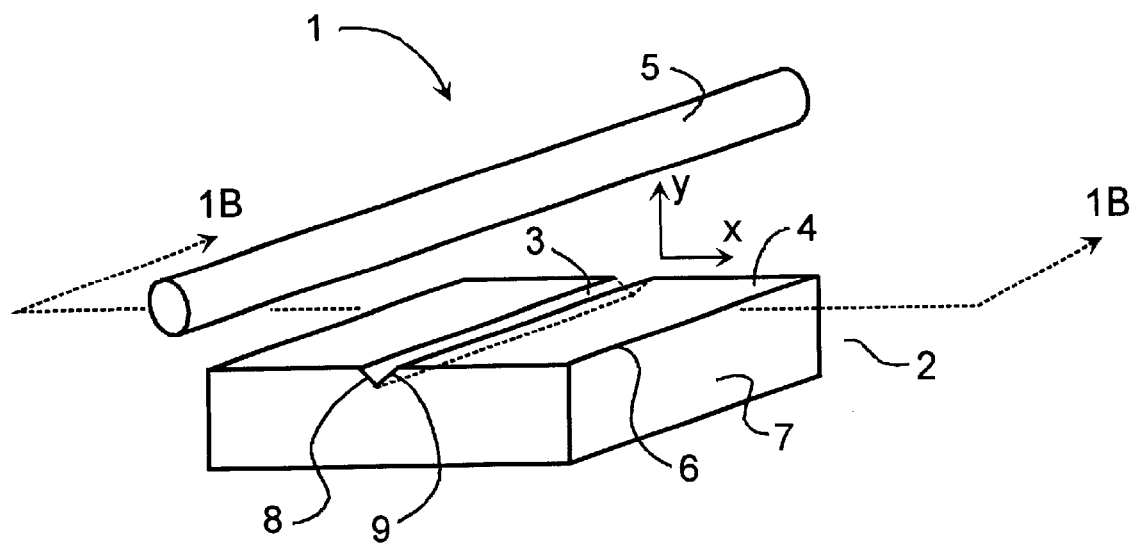
FIGS. 1A and 1B show both a perspective view and a cross-sectional view of a first of two prior arts with structure and means for positioning a fiber within a groove in order to maintain a two-dimensional relationship relative to features in a supporting substrate.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 1B:
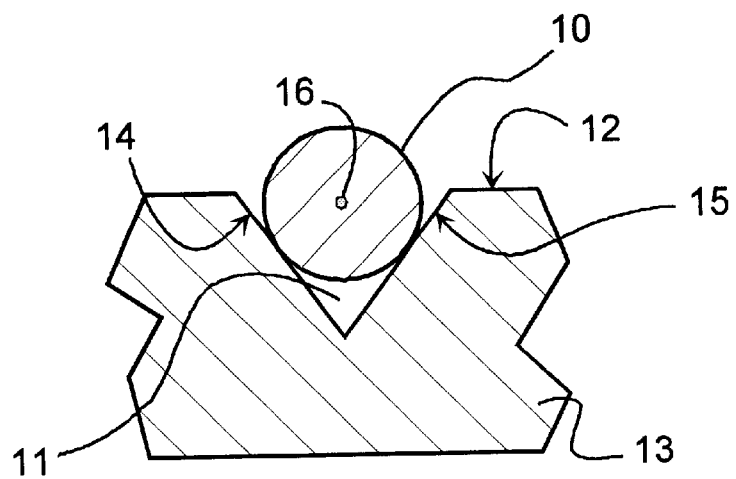

Reference is now made to FIG. 1, which consists of two parts, FIG. 1A and FIG. 1B, that illustrates a prior art for placing and positioning a fiber within a groove in the surface of a substrate. The groove is used for positioning the fiber in two dimensions, one within the plane of the surface of the substrate and the other perpendicular to that same surface. In addition, the groove orients the direction of the fiber to lie parallel to the plane of the surface as well as in a particular direction within the surface, that of the direction of the groove. FIG. 1A shows a fixture and fiber arrangement 1 comprised of a fiber 5 and a substrate 2 having a groove 3 located on a planar surface 4. The fiber S is not easily placed within the groove 3 since the diameter of the fiber is comparable to the width of the groove 3. In the prior art, the placement of the fiber 5 into the groove 3 involves rolling the fiber 5 along the surface 4. This is done while attempting to maintain the fiber 5 parallel to the groove 3 and searching for the condition that the fiber will drop into the groove 3. Once in the groove 3, the fiber 5 is finally located in two-directions and two rotations relative to the groove 3, and consequently in relation to both the substrate 2 and its surface 4. This operation of locating the fiber 5 within the groove 3 is sometimes unduly time-consuming and can additionally require maintaining the fiber 5 in a straight configuration.

For the fiber 5 to be located precisely relative to features (not shown) on the surface 4, reference edges 6, or another surface 7 of the substrate 2, the geometry of the groove 3 must be precise in relationship to that of the fiber 5. If it is the intention that the groove 3 holds the fiber 5 in a straight configuration, the groove must be straight and its surfaces 8 and 9 free of bumps, burrs, contaminating objects, and other position-disturbing defects. The best known prior art for achieving these objectives for straightness and precision is to use a V-groove anisotropically wet-etched into the 100 surface of a cubic crystal such as silicon (Si)or gallium arsinide (GaAs). The term used here "100" is a Miller index of crystal orientation. Other crystalline materials can also be used such as, but not. limited to, lithium-niobate (LiNbO3), potassium dihydrogen phosphate (KDP), lithium tantalate (LiTaO$_3$), barium titanate (BaTiO$_3$), silicon germanium (SiGe), indium phosphide (InP), gallium indium arsinide (GaInAs), and crystals of III-V compounds in general, or even some organic crystals.

FIG. 1B shows the geometry of a circular cross-section of a perfect fiber 10 situated in a V-groove 11 formed in the surface 12 of a 100 silicon crystal substrate 13. The surfaces 14 and 15 defining the V-groove 11 are 111 planes of the crystal and form the included angle of approximately 70.53 degrees. The direction of the groove is parallel to 110 planes. It is therefore plain to see that the width and angle at the bottom of the groove determine a depth of the V-groove 11, and this result, along with the fiber diameter, determines the position of the axis 16 of the fiber 10. The position of the fiber 10 is thereby precisely determined by simple geometric relationship relative to the groove 11, and consequently to the surface 12 and therefore the substrate 13. It is important to note that the flatness of 111 crystal faces defining the V-groove facilitate accurate placement of a fiber. It is equally important to note that the flatness of the 100 crystal plane defining the top surface 12 aids in aligning the fiber with other objects and features also located relative to this surface 12. These other features may include such items as a light source, a detector, a grating, a diffractive optic, a non-linear material, a reflector, a grin lens, a spherical lens, a refractive prism, a polarizer, a filter, an isolator, a circulator, a modulator, an attenuator, a coupler, a modulator, a multiplexer, a switch, a planar optical circuit, and an integrated circuit.

Figure 2A:
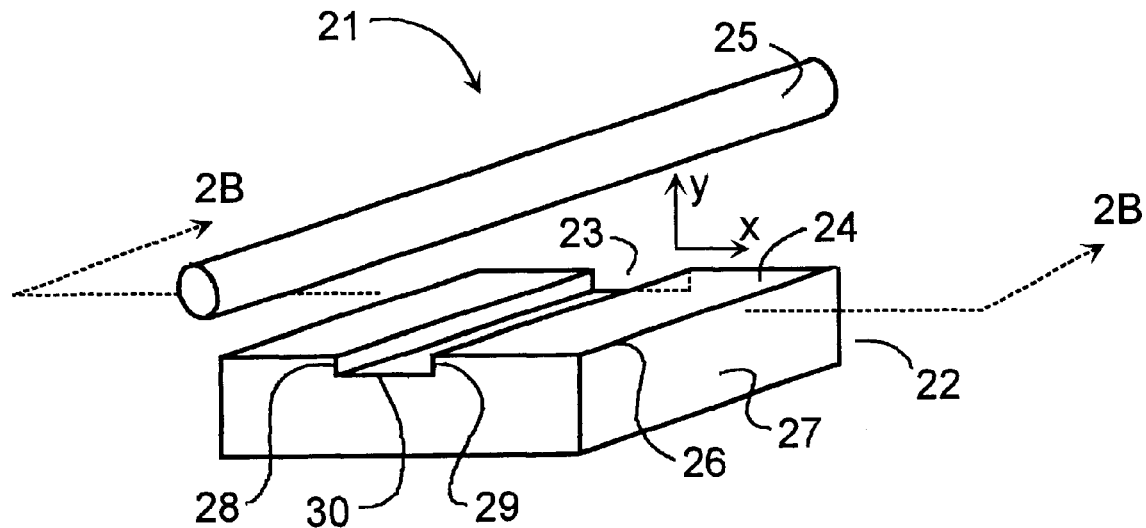
FIGS. 2A and 2B show both a perspective view and a cross-sectional view of a second of two prior arts with structure and means for holding a fiber within a groove in order to maintain a two-dimensional relationship relative to features in a supporting substrate.
Figure 2B:
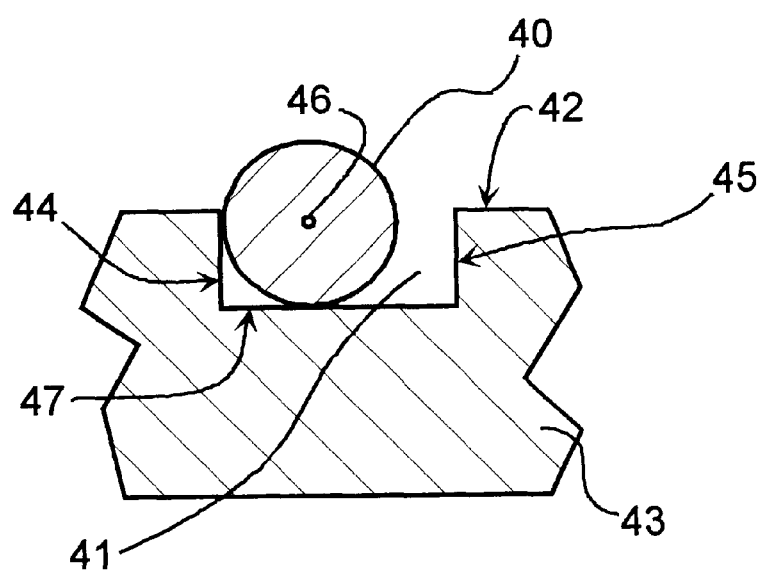

FIG. 2, which is composed of two parts, FIG. 2A and FIG. 2B, illustrates another prior art means of locating a fiber relative to a surface. The prior art illustrated in both FIG. 2A and FIG. 2B is similar to that just described and illustrated with FIG. 1A and FIG. 1B. What is different is the groove cross-section now is rectilinear instead of V-shaped. What is shown in FIG. 2A is a fixture and fiber 21 comprised of a fiber 25 and a substrate 22 having a groove 23 located on a planar surface 24. As before, the fiber 25 is not easily placed within the groove 23 since the diameter of the fiber is comparable to the width of the groove 23. In this prior art also, the placement of the fiber 25 into the groove 23 involves rolling the fiber 25 along the surface 24. This is done while attempting to maintain the fiber 25 parallel to the groove 23 and searching for the condition that the fiber will drop into the groove 23. Once in the groove 23, the fiber 25 is finally located in relation to the groove 23, and consequently in relation to both the substrate 22 and its surface 24. This operation of locating the fiber 25 within the groove 23 is also sometimes unduly time-consuming and can additionally require maintaining the fiber 25 in a straight configuration.

For the fiber 25 to be located precisely in 2-dimensions relative to features (not shown) along the surface 24, reference edges 26, or another surface 27 of the substrate 22, the geometry of the groove 23 must be precise in relationship to that of the fiber 25. If it is the intention that the groove 23 holds the fiber 25 in a straight configuration, the groove must be straight and its surfaces 28, 29 and 30 free of bumps, burrs, contaminating objects, and other position-disturbing defects. As with V-grooves, rectilinear grooves can be fabricated into crystal substrates, but the etching process steps, wet or dry, are less well defined as for V-grooves that are shaped by 111 surfaces. The sidewall surfaces 28 and 29 are prone to over-etching, while the bottom 30 depends more sensitively on etch-rates and etch times.

FIG. 2B shows the geometry of a circular cross-section of a perfect fiber 40 situated in a rectilinear, square-bottomed groove 41 formed in the surface 42 of the substrate 43 by side-wall surfaces 44 and 45 and by the bottom surface 47. It is therefore plain to see that the width and depth determine, along with the fiber diameter, determine the position of the axis 46 of the fiber 40. The position of the fiber 40 is thereby less precisely determined than by a V-groove formed by ill crystal planes (which have a relatively slow etch rate) and the single variable of V-groove width (see FIG. 1B). In the case of a rectilinear, square-bottomed groove 41, the position of the fiber 40 depends upon groove width and depth, both of which are harder to control than the one V-groove variable of width.

For more information about crystal geometry, crystal-plane orientations, Miller indices, and etching, reference can be made to standard text books known in the integrated circuit processing industry. For information on prior.art for orienting photolithographic masks precisely to crystal planes, see for example: "MEMS Packaging for Micro Mirror Switches", by L.S. Huang, S. S. Lee, E. Motamedi, M. C. Wu, and C. J. Kim, Proc. 48th Electronic Components & Technology Conference, Seattle, Wash., May 1998, pp. 592–597.

FIGS. 3 through 6 illustrate the use of new crystalline structures and methods that facilitate the placement of a fiber into an alignment groove to locate it relative to the substrate surface that contains the groove. As above, this achieves location of the fiber along two translational dimensions and about two rotational axes, but with greater ease and precision.

Figure 3:
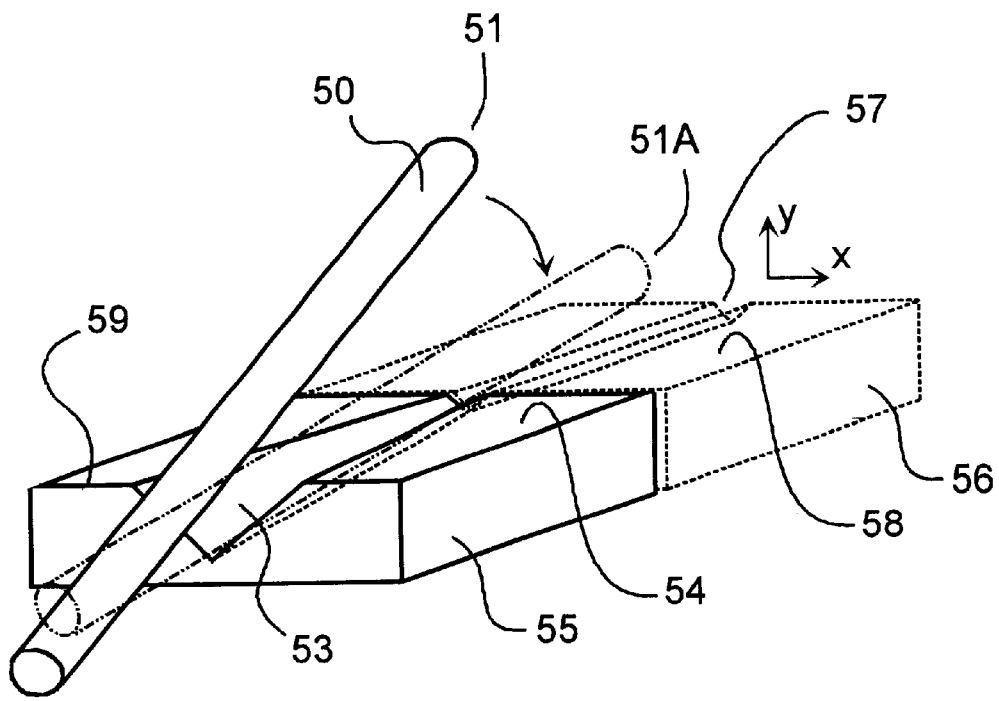
FIG. 3 shows a new structure and means by which to easily guide a fiber into a target groove of a supporting substrate by a structural fixture comprised of a tapered groove in a separate substrate used as a placement guide.

FIG. 3 shows a fiber being positioned from a first position 51 to a second position 51A within a tapered groove 53 formed in the top surface 54 of a first substrate 55. Pre-aligned with the substrate 54 is a second substrate 56 having a targeted (i.e. destination) groove 57 formed in its top surface 58 with a constant groove width. In this situation, the first substrate 55 and tapered groove 53 are being used as a tool for facilitating the placement of the fiber 50 into the groove 57 on the second substrate. The groove 57 is of constant width and cross-section, and is sized to hold a fiber partially above the surface 58 by having a width only slightly larger than the diameter of the fiber 51. It is easy to understand that with the small cross-sectional dimensions of a fiber 51 and the groove 57, it would be difficult to lay the fiber 51 into such a groove without the aid of a tool, such as comprised of the tapered groove 53 in the substrate 55.

Referring still to FIG. 3, the preferred process for placing a fiber 50 into a targeted alignment groove 57 involves the steps of:

a) pushing the side of the fiber 50 against the edge 59 of the surface 54 containing the tapered groove 53;

b) sliding (or rolling) the fiber 50 along the edge 59 toward the largest opening of the tapered groove 53, c) when the fiber 50 falls within the opening to the groove 53, which in this example is seen to have a V-shaped contour to the cross-section perimeter of the groove, and while still pushing the fiber 50 against the edge 59 which is seen to include this contour, tilting the fiber 50 toward parallelism with the groove-containing surface 54; and d) pressing the fiber 50 into the targeted alignment groove 57.

Figure 4:
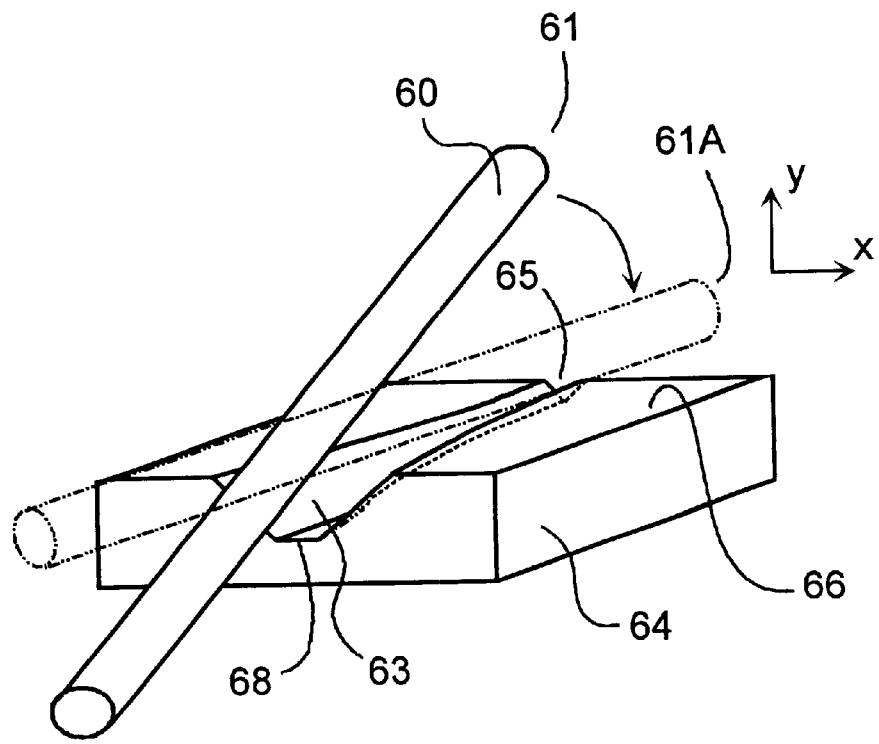
FIG. 4 shows a new structure and means by which to more easily locate a fiber into a target groove of a supporting substrate wherein the guiding means is a tapered groove portion located within the same substrate and contiguous with the target groove portion.

FIG. 4 shows a device and method similar to that just described in FIG. 3. Although here the two substrates 55 and 56 of FIG. 3 are combined into a single substrate 64. And an initial part of the groove 63 is tapered from a larger width at its opening to a smaller-width, followed by a section 65 of constant width at the other end of the surface 66. Here the fiber 60 is initially in a tilted-up orientation 6 1. It is then moved into the wider opening of the tapered section of the groove 6, and then rocked downward before being finally pressed into the later portion 65 of the groove where it is in the position 61 A parallel to the surface 66. Preferably, the length-wise contour of the groove 63, in changing from the wider portion to the narrower portion 65, is a smooth one. Also shown in FIG. 4, under-etching can create grooves still having accurately sloped sides but having a flat bottom 68 where the groove widths are larger than a desired threshold.

If in FIGS. 3 and 4, the substrates 55, 56 or 64 are made of cubic crystal having respectively their top surfaces 54, 58 and 66 comprised each of 100 surfaces, variable or fixed width and depth V-grooves can be patterned and etched with great precision. The general lengthwise directions of these V-grooves are parallel to 110 planes. The sidewalls comprising the V-shape of a constant-width groove will be of constant depth also, and will lie in, and be defined by, planes of 111 orientation. The sidewalls of a variable width V-groove will not wholly lie in 111 crystal planes, but the V-shape, in any cross-sections taken perpendicular to the groove axis, will be defined by a pair of intersecting 111 crystal planes. It is very important to observe that this constraint by the crystal planes on the shape of the V-grooves, whether they be of constant width or not, is an important property. This constraint by the crystal planes can be exploited by the current invention to achieve accurate and precise location of a fiber on a surface and in relationship to other objects and features also located on the same surface. Tapered-width and depth V-grooves can be accomplished with a large variety of contour profiles, including segmented and smooth profiles. The lithographic pattern used as the etch mask can be constructed with any of a variety of contours including linear, parabolic, hyperbolic, elliptical, and arcuate.

Figure 5:
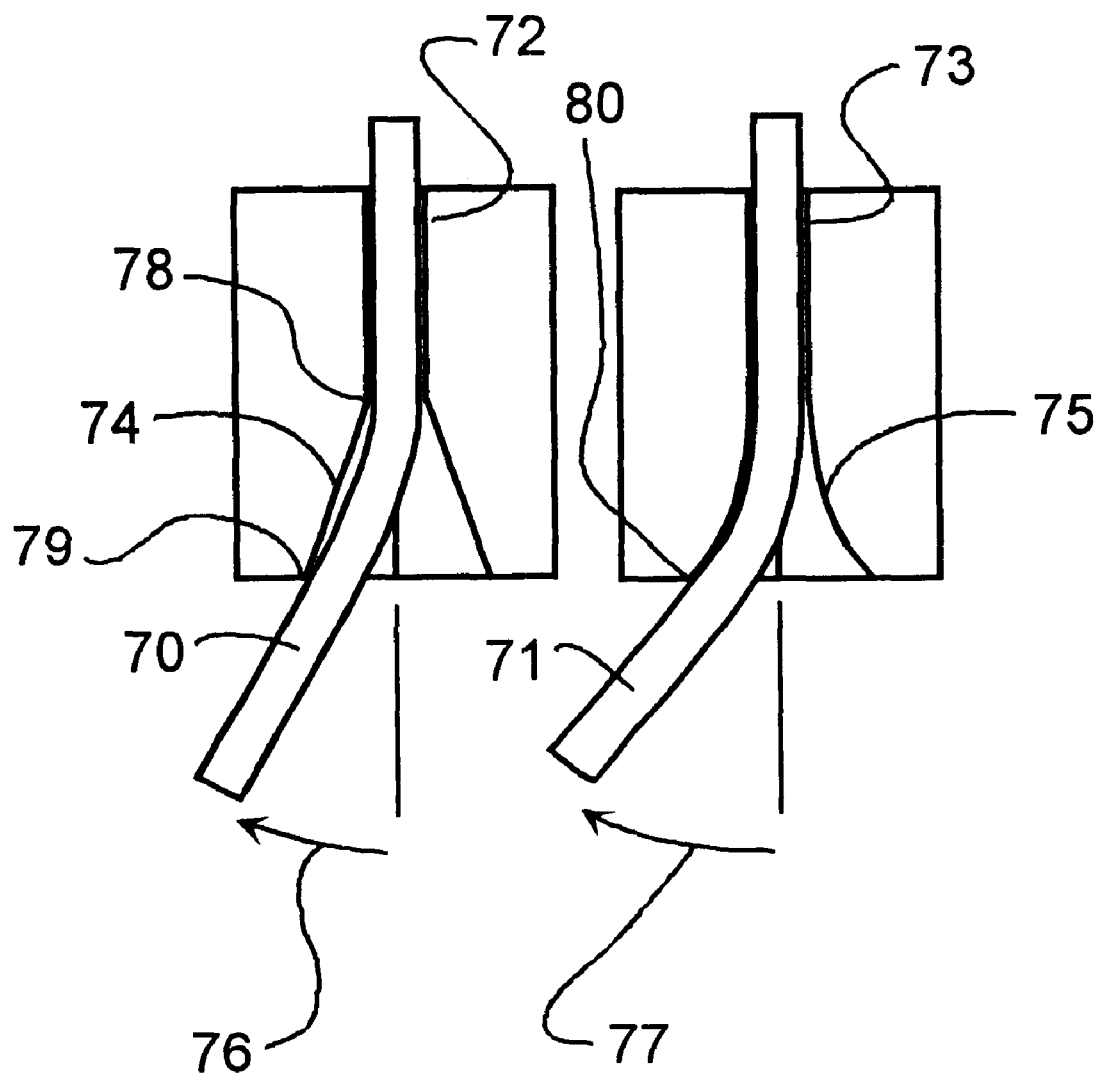
FIG. 5 shows supporting and guiding substrates that demonstrate alternative shapes for guiding grooves.

FIG. 5 shows how the choice of the profile shapes for etch masks can provide for smoother interaction between a fiber and the edges of a tapered groove as the fiber is moved into place. Fibers 70 and 71 are located in linear groove portions 72 and 73 respectively. Fiber 70 enters its linear groove-portion 72 via a linearly tapered groove-portion 74; whereas fiber 71 enters its linearly tapered groove-portion 73 via a curvilinear tapered groove-portion 75. It can be appreciated from FIG. 5 that the fiber 71 can be bent through a larger angle 76 than the angle 77 of fiber 70. Whereas fiber 70-is bent about sharp corners 78 and even 79, fiber 71 has yet to be bent about corner 80. Thus preferred embodiments, for minimizing potential handling stress on a fiber, would select a smoothly contoured taper.

Figure 6:
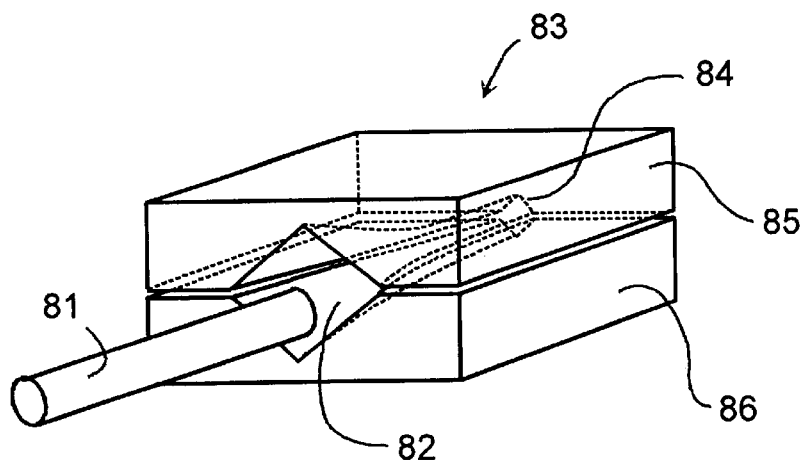
FIG. 6 shows a guiding channel constructed of two guiding and locating grooves positioned face-to-face.

FIG. 6 shows a fiber 81 as it enters a channel 82 whose entrance is large compared to the fiber diameter and shrinks deeper within the channel 82 to a section 84 of constant size comparable to the fiber size. A face-to-face pair 83 of substrates 85 and 86 forms the channel 82. Thus a crystal structure is created that forms a precisely formed funnel that necks down to a size that can constrain and locate the fiber in two dimensions very accurately. It should be clear that this structure provides an efficient means to easily locate a fiber within a position-constraining channel.

Figure 7:
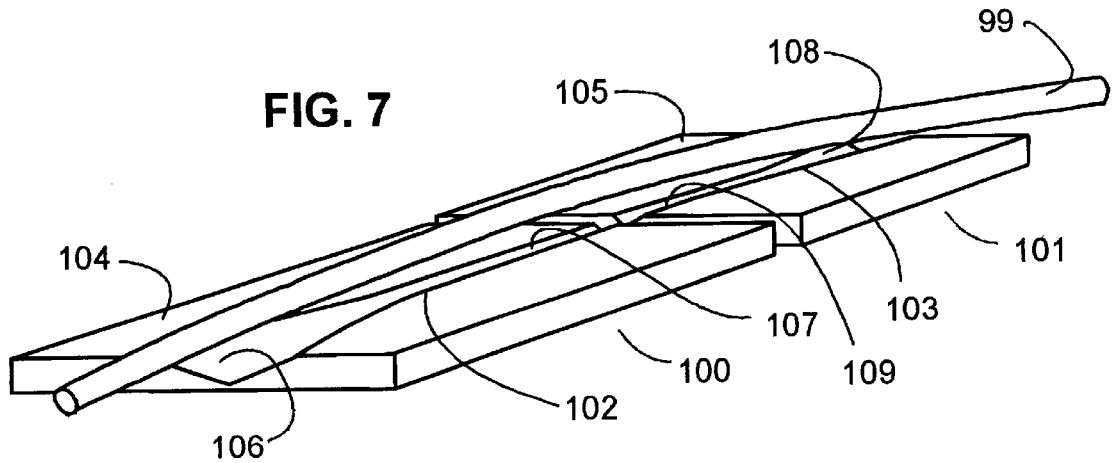
FIG. 7, shows means by which to co-align grooves in two separate substrates end-to-end.
Figure 8:
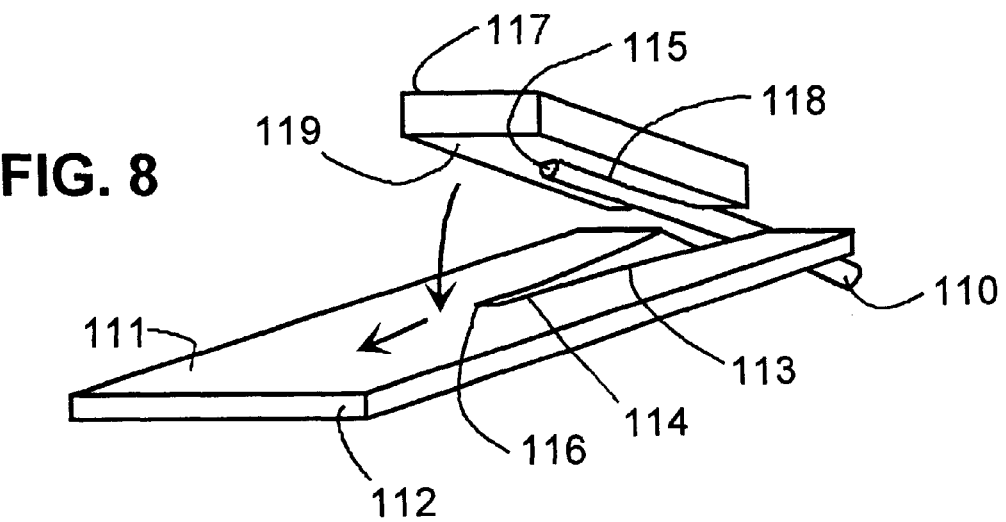
FIG. 8 also shows means by which to co-align a first substrate, having a fiber that is itself aligned and held within this first substrate, to a terminated groove within a second substrate.

FIGS. 7 and 8 describe by way of illustration that the use of tapered grooves is not limited to the easy placing and precise locating of a fiber along two translational dimensions and about two orientation axes.

FIG. 7 shows how a fiber can be used to bring together and align two substrates that are configured with grooves each having both tapered and linear portions, and with groove axes at least approximately perpendicular to the substrate edges that are to touch. (Let it be defined that a groove axis is a line lying in the plane of the surface containing the groove and bisecting the groove boundaries that are at this surface.) In FIG. 7, the two substrates 100 and 101 are of similar thickness and are placed on a common work-surface (not shown). In addition, these two substrates 100 and 101 each have a respective groove 102 and 103 located on their top surfaces 104 and 105. The groove 102 is composed of a tapered portion 106 and a linear portion 107. The groove 103 is composed of a tapered portion 108 and a linear portion 109. The fiber 99 is bowed slightly in order to first place it within the tapered sections 106 and 108 as shown. Then it is brought down deeper into the two grooves 102 and 103, becoming less bowed in the process. As the fiber 99 is forced downward into the grooves 102 and 103, the substrates 100 and 101 are made by the fiber 99 to move into alignment with one-another, that is, to align the two linear portions 107 and 109 co-linear with one-another. It is then an easy matter, maintaining downward pressure on the fiber 99 to also urge the two substrates 100 and 101 together end-to-end such that the two linear portions 107 and 109 of the grooves 102 and 103 come together. Note that this operation could be performed also without the grooves having linear portions, wherein the tapered portions would span the entire distance across the respective substrate surfaces.

FIG. 8 shows how precision V-grooves can be used to locate a fiber in three translational dimensions. Furthermore it shows how precision V-grooves can be used to either or both locate one substrate surface in two translational dimensions against another or to locate a fiber in three translational dimensions on a substrate and at the same time control its angle of rotation about its own axis. In FIG. 8, a fiber 110 is shown being located into a precise position on a surface 111 of a substrate 112 by using a V-groove comprising a tapered portion 113 and a linear portion 114 according to previously described aspects of this invention. However, FIG. 8 also shows that one end 115 of the fiber 110 can then be shoved against a closed end 116 of the groove portion 114.

Although not shown in FIG. 8, this example of a closed end 116 could just as well represent the placement of the fiber end 115 against a port of a planar waveguide constructed in the same surface 111, or to alternative optical devices including a light source, detector, filter. Although also not shown in FIG. 8, this example of a closed end 116 could just as well represent placement of the fiber end 115 at a desired location relative to electrical or optical circuitry on surface 111. Such an operation positions the fiber 110 in two translational dimensions within the plane of the surface 111. It also positions the fiber 111 to lie at a determined depth in the groove relative to the surface as defined by the geometry of the fiber 110 and the groove portion 114. The fiber 110 can be first fixed within an initially supporting substrate 117 by a groove 118 in the surface 119 of that substrate 117. Then when the surface 119 of this substrate 117 is brought into parallelism and close proximity with the surface 111 of substrate 112, the fiber is additionally aligned rotationally about its own axis with a predetermined value. Such rotational orientation is important when dealing with polarization-maintaining fiber optics.

Figure 9:
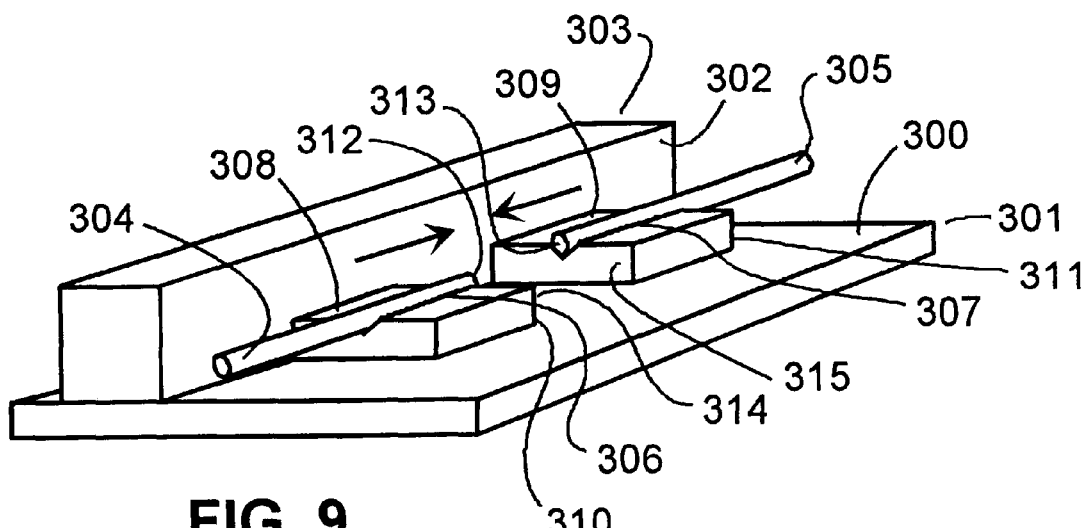
FIG. 9, shows prior art for aligning two fibers end-to-end by using edges and surfaces of their supporting substrates to reference against an alignment fixture.

FIGS. 9 through 12 depict various means for aligning two fibers end-to-end. FIG. 9 shows some prior art for aligning two fibers end-to-end. This prior art accomplishes end-to-end fiber alignment by using edges and surfaces of supporting substrates to reference against an alignment fixture. But the device and method suffers from the dimensional errors of imperfect substrate shapes and tolerance build-ups due to the number of parts involved and due to inaccuracies in fabricating the fiber-supporting grooves cut into the substrate surfaces. What is shown is a planar reference surface 300 of a supporting substrate 301. Resting on this supporting substrate 301 is a second reference substrate 303 having a second reference surface 302 that is made perpendicular to the first reference surface 300. Two fibers 304 and 305 are aligned within grooves 306 and 307 located in top surfaces 308 and 309 of fiber-supporting substrates 310 and 311. The fiber-supporting substrates 310 and 311 are cut to reference simultaneously against both the reference surfaces 300 and 302. Furthermore the top surfaces 308 and 309 are cut parallel to and equidistant from the plane of the supporting surface 300. And, of the two fiber-supporting substrates 310 and 311, the two surfaces 314 and 315 that face one-another need to be co-parallel. The grooves 306 and 307 should be accurately placed in and parallel to their respective surfaces 308 and 309, and they should both be located an identical distance and parallel from both reference surfaces 300 and 302. The fibers 304 and 305 should be located in their respective grooves 306 and 307, with their ends 312 and 313 intersecting the respective planes that include the surfaces 314 and 315 of their respective fiber-supporting substrates 310 and 311. Then the fiber ends 312 and 313 can be brought into end-to-end alignment along a common axis (common axis not shown) by simply moving the two fiber-supporting substrates 310 and 311 together, while maintaining contact between the fiber-supporting substrates 310 and 311 and the reference surfaces 300 and 302.

Figure 10:
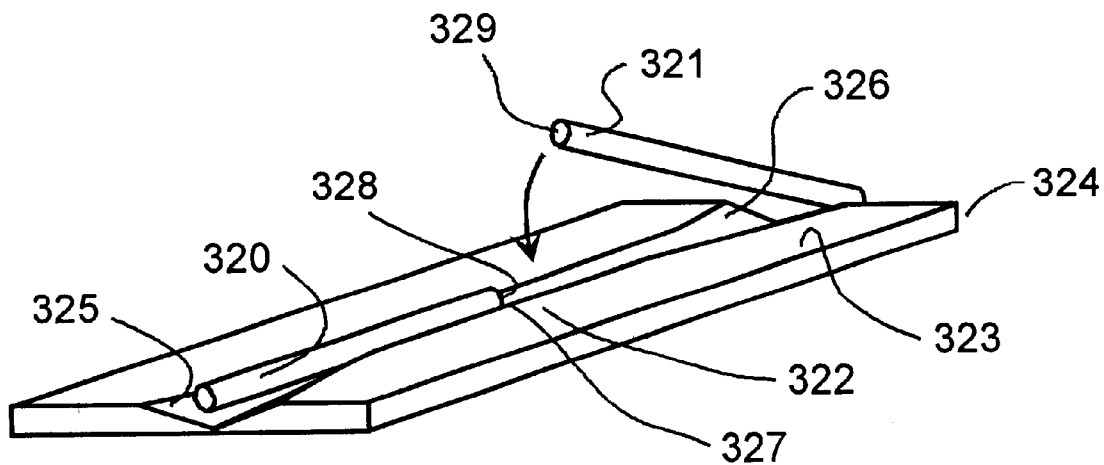
FIG. 10 shows bi-directionally-tapered grooves in a single substrate used to align two fibers end-to-end.

FIG. 10 shows another device and method of the current invention, which reduces the number of parts required to bring two fibers together end-to-end along a common axis. Two fibers 320 and 321 are placed within a common groove 322 constructed from the surface 323 of a substrate 324. The groove 322 is comprised of two end sections 325 and 326 that are tapered inward toward a common mid-section 327.

The substrate is preferably of cubic crystalline material with surface 323 being a 100 crystal plane, and the sides of the mid-section 327 of the groove 322 being defined by 111 crystal planes that form a V-cross-section to the groove. By under-etching, the groove can be made with the otherwise deeper portions having a flat bottom (not shown) instead of a sharp concave vertex. The axis of the groove 322 (as defined above in discussion of FIG. 7) is a straight line that is directed parallel to 110 crystal planes. The fibers 320 and 321 are fit into the groove from opposite end sections 325 and 326 with the method described above in describing FIG. 3 and FIG. 4. Once the fibers are aligned in midsection 327, they can be pushed (one or the other or both) together by sliding along the groove so that their ends 328 and 329 meet.

Figure 11:
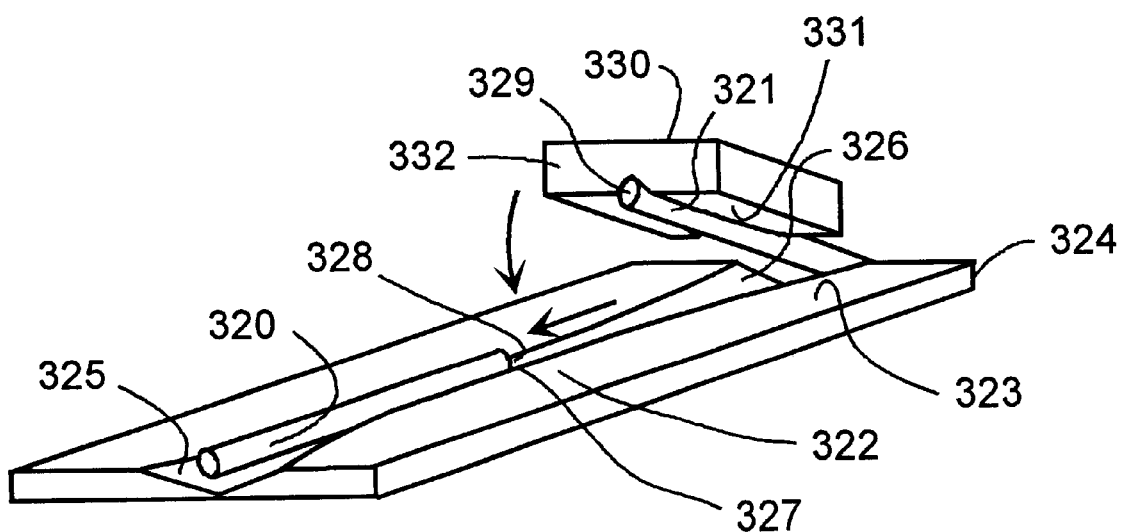
FIG. 11 shows both a bi-directionally-tapered groove and a uni-directionally-tapered groove used in combination to align two fibers end-to-end.

FIG. 11 shows a similar device and method as just described for FIG. 10, but the fiber 329 is first installed, rotated and fixed within a supporting substrate 330 with methods of the current invention already described as in FIG. 3 or FIG. 4. The rotation of the fiber 321 is to orient it in a particular orientation about its fiber axis (not shown) as may be important for use of polarization maintaining fibers. The function of this additional supporting substrate 330 is to provide a reference surface 331 that can be brought flat against the supporting surface 323 and thereby determine a particular rotational orientation for fiber 321 about its own axis (axis not drawn), relative to the other fiber 320. The end 329 of the fiber 321 can be located in the plane of the front surface 332 of the supporting substrate 330, but this is optional.

Figure 12:
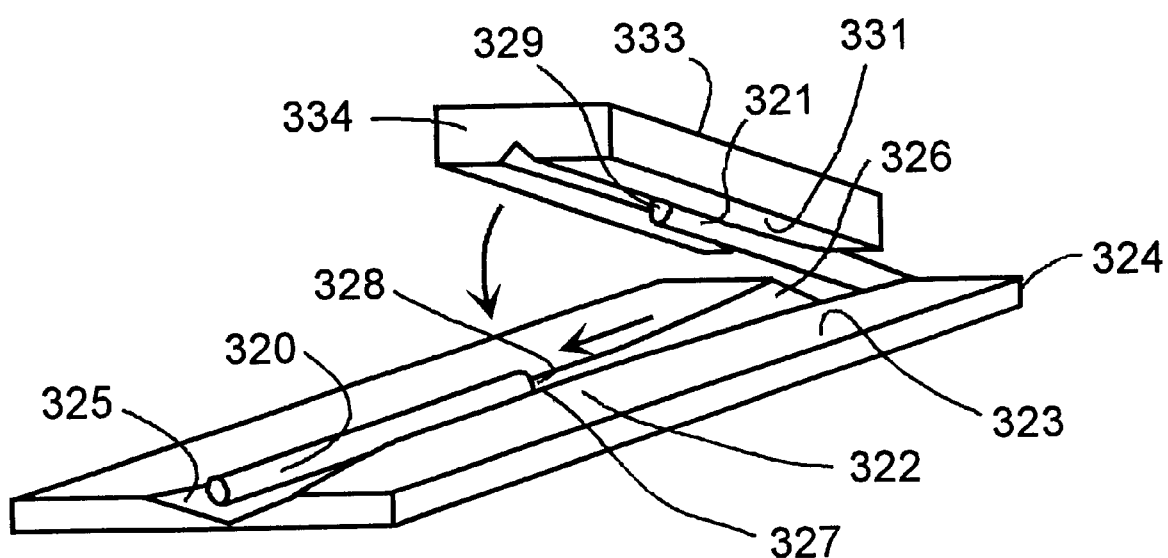
FIG. 12, similar to FIG. 11, also shows both a bi-directionally-tapered groove and a uni-directionally-tapered groove used in combination to align fibers end-to-end, but wherein the two substrates involved end up covering up the interface between the two fiber ends.

FIG. 12 shows a similar device and method as just described for FIG. 11 above, but the front surface 334 of the supporting substrate 333 is, in this case, located beyond the end 328 of the fiber 321. The advantage of thus extending the supporting substrate 323 beyond the end of its fiber 321 is that this supporting substrate 333 will end up covering both fiber ends 328 and 329, allowing the region of fiber-to-fiber contact (not shown) to be sealed.

Figure 13A:
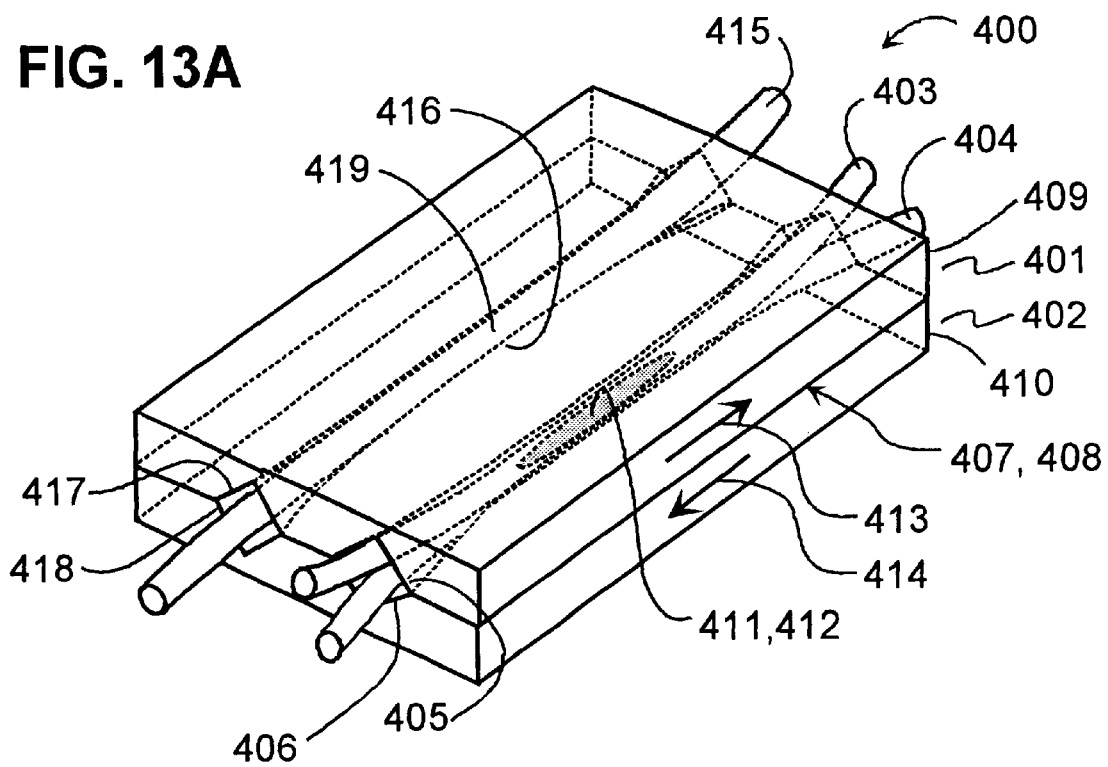
FIGS. 13A and 13B show how varying the widths of face-to-face grooves, and alignment with a slidable fiber key, can facilitate the tuning of optical coupling ratio and efficiency in a 4-port fiber optic made with side-polished fibers. This structure permits tuning by way of either or both linear translation and limited rotation. The varying widths allow the limited rotation.
Figure 13B:
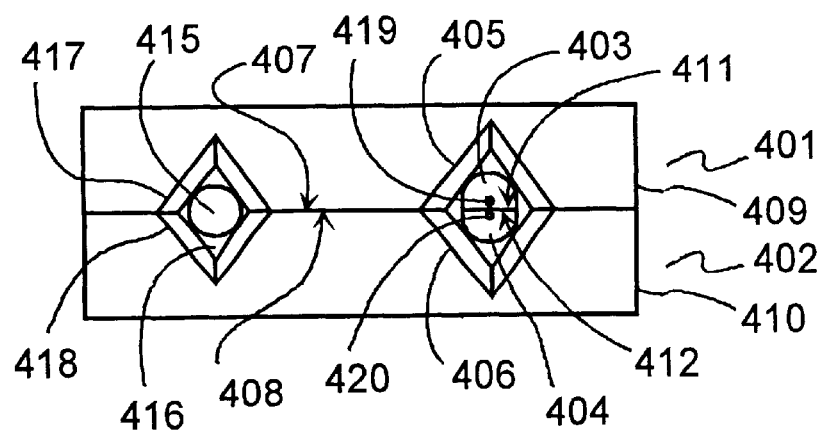

FIG. 13 is composed of two parts: FIG. 13A and FIG. 13B and shows how varying the widths of face-to-face grooves, as well as alignment with a sliding fiber-key, can facilitate the tuning of optical coupling ratio (and efficiency) between two fibers within a 4-port device. This device can be any of the group including couplers, add-drop multiplexers, taps, splitters, joiners, filters, modulators or switches. This tuning is accomplished by adjusting the interaction length between two evanescently coupled fibers.

FIG. 13A shows a tunable 4-port fiber optic device 400, such as a coupler or add-drop multiplexer. This 4-port device 400 is comprised of two half-couplers 401 and 402 comprised in turn-of respective side-polished fibers 403 and 404 installed within respective varying-width V-grooves 405 and 406 etched into 100 crystal surfaces 407 and 408 respectively (shown face-to-face) of respective substrates 409 and 410. The two substrates can be slid over one another in the direction parallel to the long axes (not shown) of the two side-polished areas 411 and 412. The two side-polished areas 411 and 412 are shown at a position where they fully overlap one another. The side-polished areas 411. and 412 of the fibers 403 and 404 have an elliptical shape with long axes parallel to the groove axes (not shown). The arrows 413 and 414 indicate the direction of motion desired for tuning coupling ratio (or coupling efficiency).

As illustrated in FIG. 13A, the device 400 is additionally comprised of a third fiber 415. Fiber 415 is in a bi-directionally tapered channel 416 constructed of two additional varying-width V-grooves 417 and 418 etched into the surfaces 407 and 408, parallel to grooves 405 and 406 but offset from them. Fiber 415 serves as an alignment key within this channel 416, but allows for the motion described with which to tune the optical coupling ratio and efficiency of the 4-port assembly. By eliminating most of any linear portion to the channel 416, the two half-couplers 401 and 402 may also be allowed some rotation about the region of narrowest constriction 419. This rotation is easy to control with the substrates being of a significant scale larger than the side-polished areas and provides a tuning method alternative to strict translation 413 and 414 described above.

FIG. 13A illustrates yet another advantage of the bi-directionally tapered channels 416 and that formed by grooves 405 and 406, is that the fibers 415, 403 and 404 will experience less chance to be bent and stressed entering or leaving the channel 416 than were the channel 416 of constant cross-section. The taper at the ends of these channels can be accentuated to help achieve additional avoidance of stress on the fibers 415, 403 and 404 from otherwise being bent about a sharp edge. It is important in high-bandwidth fiber optic applications, such as in modern data- and telecommunications networks, to avoid stressing or straining fibers. This is because strain-induces birefringence in the fiber and this causes polarization mode-dispersion that can result in high bit-error-rates.

FIG. 13B shows an end-view of the device illustrated in FIG. 13A with all similar parts identified by the same numbers, except the view is as though the fibers 415, 403 and 404 were terminated at the midpoints of the channels. In addition, the cores 419 and 420 to fibers 403 and 404 are depicted as shaded disks or spots. Note how in this view, one can see the interface between the two side-polished areas 411 and 412 as the region of contact between them. And one can perceive how the side-polish has allowed the cores 419 and 420 of the two fibers 403 and 404 to lie closer to one another to effect better evanescent coupling of light waves between the two cores 419 and 420.

Also note in FIG. 13B that the interfacing surfaces 407 and 408 between the two half-couplers 401 and 402 is shown along with the areas 411 and 412 of the optics being optically coupled, in this case two side-polished optical fibers 403 and 404. One or both of these side-polished optical fibers along with their respective grooves 405 and 406 could just as well be replaced with planar waveguides from planar optical circuitry embedded in the surfaces 407 and 408. Also not shown, all or a portion of the surfaces 407 and 408, or all or a portion of areas 411 and 412, could be coated with one or more thin films, or with a thin film of fluid. And electrical or optical circuitry could be embedded in the neighboring regions in either or both of the surfaces 407 and 408.

Although the invention is described with respect to preferred embodiments, modifications thereto will be apparent to those skilled in the art. Therefore, the scope of the invention is to be determined by reference to the claims that follow.

I claim:

1. A method of positioning a first fiber comprising:
   (a) providing said first fiber to be aligned, wherein said first fiber has a diameter, an axis, and a side portion;
   (b) providing a first groove within a first surface of a first substrate, wherein said first groove has a first width at a first intersection where it intersects a first edge of said first substrate, and has a second width away from said first edge, and wherein said first width is larger in value than said second width, and said second width is closer in value to said diameter;
   (c) urging said side portion of said first fiber against said first edge and into said first intersection;
   (d) pivotally rotating more of said first fiber into said first groove; whereby said first fiber is located in said first groove with a minimum of alignment effort.

2. The method of claim 1 further including urging said first fiber along said first groove to a first final position defined relative to one of the group including a coupling position to an end of another fiber, a coupling position to a planar waveguide, a light source, a filter, a detector, an optical device, and an end of said first groove.

3. The method of claim 1 further including:
   (a) providing an opposing second fiber within said first groove, wherein said second fiber ends within said first groove;
   (b) urging said first fiber along said first groove to a stopping location relative to said end of said second fiber.

4. The method of claim 1 further including:
   (a) attaching at least a portion of said first fiber within said first groove with a prescribed rotational orientation about said axis,
   (b) providing a second substrate with a second surface having a second groove, said second groove having a second intersection with a second edge of said second surface, wherein said second groove has a third width at said second intersection, with said third width larger than a fourth width which is away from said second edge, and wherein said fourth width is closer in value to said diameter of said first fiber,
   (c) urging said first fiber against said second edge and into said second intersection;
   (d) pivotally urging more of said first fiber about said second intersection into said second groove while rotating said first fiber, by rotating said first substrate, to place said first and second surfaces parallel to one another;
   whereby said first fiber becomes sandwiched between said first and second substrates with a prescribed rotational alignment.

5. The method of claim 4 further including:
   (a) prescribing a destination position along said second groove; and
   (b) sliding said first surface on said second surface along said second groove until said first fiber comes to said destination position.

6. A method of co-aligning two alignment grooves comprising:
   (a) providing a fiber to be used as an alignment tool, wherein said fiber has a diameter;
   (b) providing two substrates to be co-aligned, wherein each said substrate has both a first and a second surface with said second surface plane-parallel and equidistant to said first surface;
   (c) providing each substrate with one of said two alignment grooves, wherein each said alignment groove spans said first surface respectively and has a first end of width approximately equal to said diameter of said fiber and a second end that has a width larger than said first end;
   (d) providing a work surface on which said second surfaces of said substrates are placed slidably on said work surface;
   (e) first disposing said two substrates to coarsely align said two alignment grooves to be co-axial with their said first ends close to one another;
   (f) disposing said fiber to curve toward said first surfaces to contact said substrates at said second ends;

(g) urging said fiber down into said two alignment grooves starting near said second ends of said two alignment grooves and working inward toward said first ends;

(h) urging said substrates together while keeping said fiber within said two alignment grooves;

whereby said substrates become precisely aligned with their said two alignment grooves oriented co-axially and said substrates contacting one another.

7. A tunable fiber optic apparatus having an optical coupling ratio that can be adjusted, the apparatus comprising:

(a) two substrates, wherein each said substrate has a first surface with a first groove suitable for holding a fiber, wherein said first surfaces are slidable on one another, and wherein a plane of contact exists between the two said first surfaces;

(b) two optical fibers each with a mutually plane-parallel side-polished first area, wherein said first areas are sandwiched between said first surfaces, and wherein each said optical fiber lies within only one of said first grooves, and wherein said first areas of-said optical fibers are pressed against one another and lie substantially within said plane of contact;

(c) at least one alignment groove on each of said first surfaces wherein said alignment grooves are parallel and offset relative to said first grooves such that said alignment grooves together form a channel between said two first surfaces;

(d) a third fiber positioned in said channel and having a lengthwise direction, wherein said third fiber constrains substrate sliding to a direction substantially parallel to said lengthwise direction;

whereby sliding said two substrates against one another substantially along said lengthwise direction easily adjusts said optical coupling ratio.

8. The tunable fiber optic apparatus of claim 7 wherein said channel is bi-directionally tapered forming a region of narrowest channel width and a center of rotation therein, wherein at least some slidable rotation is possible about said center of rotation.

9. The tunable fiber optic apparatus of claim 8 wherein said optical coupling ratio is tunable by said rotational adjustment.

10. The tunable fiber optic apparatus of claim 7 wherein said apparatus forms at least one apparatus selected from the group including a coupler, add-drop multiplexer, tap, splitter, joiner, filter, modulator and switch.

11. The tunable fiber optic apparatus of claim 7 wherein at least one of said first surfaces further includes circuitry of type selected from the group including electrical and optical.

12. The tunable fiber optic apparatus of claim 7 wherein at least one surface selected from the group including said first surfaces and said first areas further includes at least one thin film.

13. The tunable fiber optic apparatus of claim 7 wherein said plane of contact may include a thin film of fluid.

14. A method of tuning an optical coupling ratio between two side-polished optical fibers, the method comprising:

(a) providing two substrates, wherein each said substrate has a first surface with a first groove suitable for holding a fiber, wherein said first surfaces are slidable on one another, and wherein a plane of contact exists between the two said first surfaces;

(b) providing two optical fibers each with a mutually plane-parallel side-polished first area, wherein said first areas are sandwiched between said first surfaces, and wherein each said optical fiber lies within only one of said first grooves, and wherein said side-polished first areas of said optical fibers are pressed against one another and lie substantially within said plane of contact;

(c) providing at least one alignment groove on each of said first surfaces wherein said alignment grooves are parallel and offset relative to said first grooves such that they together form a channel between said two first surfaces;

(d) providing a third fiber having a lengthwise direction;

(e) positioning said third fiber into said channel, wherein said third fiber constrains substrate sliding to a direction substantially parallel to said lengthwise direction; and (f) sliding one said side-polished first area against the other by sliding said substrates against one another substantially along said lengthwise direction; whereby said optical coupling is easily tuned.

15. The method of claim 14 further including:

(a) providing said alignment grooves with a bi-directional taper in said plane of contact to form a region of narrowest channel width and a center of rotation therein;

(b) tuning said optical coupling ratio by slidably rotating said substrates about said center of rotation.

16. A fiber holder for guiding and positioning a portion of at least one fiber, said fiber holder comprising:

(a) a substrate made of a rigid material, (b) a first surface on said substrate;

(c) a first edge defining at least a portion of said first surface;

(d) at least a first groove in said first surface, of sufficient size to hold a portion of said fiber;

(e) a first location on said first surface where said first groove intersects said first edge;

(f) a first groove width and a first groove depth at said first location;

(g) a second location on said first surface along said first groove away from said first location.

(h) a second groove width and a second groove depth at said second location;

(i) a first groove length between said first location and said second location;

(j) a third location on said first surface along said first groove away from both said first location and said second location;

(k) a third groove width and a third groove depth at said third location;

(l) a second groove length between said second location and said third location;

(m) first additional groove widths and first additional groove depths along said first groove length, wherein at least one of the group including said first additional groove widths and first additional groove depths increases continuously, smoothly and more rapidly than linearly along at least a portion of said first groove length in direction away from said second location and toward said first location;

(n) second additional groove widths and second additional groove depths along said second groove length, wherein at least one of the group including said second additional groove widths and second additional groove depths stays constant along at least a portion of said second groove length;

wherein said first width is substantially larger than a diameter of said fiber, and said second width and said third width are nearer that of said diameter;

whereby said first groove width, being larger than said second additional groove widths, more easily receives said fiber, making placement of said fiber into said first groove easier by commencing with pivoting said fiber about said first edge at said first location and then into said first groove at said second location and said third location, helping to precisely locate said fiber at least within said first groove over said second length and without said fiber encountering any sharp bends.

17. The fiber holder of claim 11 further including said fiber bonded to said substrate within said first groove at least somewhere along said second groove length, wherein said fiber remains free to move around within said groove along at least a portion of said first groove length;

whereby said fiber is strain relieved over at least some of said first groove length by virtue of said fiber encountering only smooth surfaces therealong and between said first groove length and said second groove length.

18. The fiber holder of claim 11 wherein said substrate is made of one of the group including a crystal material, semiconductor material, quartz material, and plastic material, and wherein at least one ratio of width to depth at one said location can be different from that at another said location.

19. The fiber holder of claim 11 wherein said substrate is made of crystal, and wherein at least a portion of said first groove is at least partially defined by a crystal plane.

20. The fiber holder of claim 19 wherein said first surface lies substantially in a crystal plane.

21. The fiber holder of claim 19 further comprising:
(a) groove cross-section perimeters; and
(b) contours of said perimeters; wherein at least a significant portion of said contours are defined by etching to lie substantially in at least one crystal plane.

22. The fiber holder of claim 21 wherein at least one of said contours is V-shaped.

23. The fiber holder of claim 21 wherein at least one of said contours has sloped sides and a flat bottom.

24. The fiber holder of claim 11 wherein at least a portion of said first surface is substantially planar.

25. The fiber holder of claim 11 further including
(a) said fiber, wherein said fiber is an optical fiber in said first groove, and,
(b) positioned along said first groove, at least one of the group including a coupling position to an end of another fiber, a coupling position to an end of a planar waveguide. a light source, a filter, a detector, an optical device, an end of said first groove at said third location, and an end of said fiber.

26. The fiber holder of claim 11 further including said fiber in said first groove. wherein said fiber is an optical fiber with a side-polished area, and, located at least somewhere along said second groove length, at least one of the group including a side-coupling to another fiber, a side-coupling to a planar waveguide, a coupler, an add-drop multiplexer, a demultiplexer, a tap, a splitter, a joiner, a filter, a polarizer, a reflector, an attenuator, a modulator, and a switch.

27. The fiber holder of claim 11 further including additional grooves for guiding and holding additional fibers.

28. The fiber holder of claim 11 further including a second intersection of said first groove with a second edge of said first surface.

29. The fiber holder of claim 11 further including a fourth location along said first groove located farther from said first edge than said third location, wherein the distance between said third location and said fourth location along the groove defines a third groove length, wherein said first groove has a fourth groove width and a fourth groove depth at said fourth location, and wherein said fourth width is substantially larger than said diameter.

30. The fiber holder of claim 29 wherein said fourth location is also the location of a second intersection of said first groove with a second edge defining at least a portion of said first surface.

31. The fiber holder of claim 29 further including:
(a) a first optical fiber inserted into said first groove, said first fiber having a first diameter and passing through said first location;
(b) a second optical fiber inserted into said first groove, said second fiber having a second diameter and passing through said second location;

wherein the diameters are at least approximately the same, and said first groove width and said fourth groove width are both substantially larger than these diameters;

whereby an optical connection is easily afforded between said first and second fibers at a location along said second groove length.

32. The fiber holder of claim 11 wherein at least one of the group including (a) one of the groove widths and (b) one of the groove depths varies along at least a portion of said first groove with a contour shape that is, at least approximately, one of the group including linear, parabolic, hyperbolic, elliptic, and arcuate.

33. The fiber holder of claim 25 further including a second such fiber holder with its respective optical fiber, wherein the two holders are attached to one another with their said first surfaces face-to-face.

34. The fiber holder of claim 26 further including a second such fiber holder with its respective side-polished optical fiber, wherein the two holders are attached to one another with their said first surfaces face-to-face and their side-polished areas opposing one another.

35. The fiber holder of claim 34 further including:
(a) an alignment fiber, and,
(b) within each said first surface, at least one alignment groove parallel to and offset an equal distance from its said first groove;

wherein at least one of said alignment grooves is arcuate along at least a portion of its length; wherein each alignment groove, viewed in a plan view to its respective first surface, runs parallel to its respective first groove, and wherein said alignment fiber is positioned within an alignment channel formed by oppositely facing these alignment grooves;

whereby said side-polished areas opposing one another can be finely tuned in their locations relative to one another by any of the group of actions including (a) sliding said first surfaces relative to one another along said alignment channel and (b) slight rotation of one said first surface over the other to the extent allowed by the combination of groove width tolerancing and shortening of the distance over which the alignment fiber offers restraint to such rotation.

* * * * *

UNITED STATES PATENT AND TRADEMARK OFFICE
CERTIFICATE OF CORRECTION

PATENT NO. : 6,516,131 B1
DATED : February 13, 2003
INVENTOR(S) : Barclay J. Tullis It is certified that error appears in the above-identified patent and that said Letters Patent is hereby corrected as shown below:

Column 3,
Line 11, substitute "use of tapered" for -- use tapered --;
Line 55, substitute "a part" for -- apart --.

Column 4,
Line 67, substitute "5" for -- S --.

Column 5,
Line 27, delete ".".

Column 6,
Line 24, substitute "111" for -- 111 --;
Line 32, delete the first occurrence of "determine";
Line 35, substitute "111" for -- ill --;
Line 44, delete "."after prior.

Column 7,
Line 31, substitute "61" for -- 6 1 --;
Line 33, substitute "63" for -- 6 --;
Line 35, substitute "61A" for -- 61 A --.

Column 8,
Line 8, substitute "77 than the angle 76" for -- 76 than the angle 77 --, substitute "70 is" for -- 70-is --.

Column 10,
Line 2, substitute "100" for -- 100 --;
Line 6, substitute "68 (shown in FIG. 4)" for -- (not shown) --;
Line 33, substitute "329" for -- 328 --;
Line 34, substitute "333" for -- 323 --;
Line 58, delete "." after "411".

Column 11,
Line 13, delete "is";
Line 15, substitute "respective channel than were the channel" for -- channel 416 than were the channel 416 --;
Line 22, substitute "strain induces" for -- strain-induces --;
Line 23, insert -- , -- after fiber;
Line 37, substitute -- are -- for "is".

UNITED STATES PATENT AND TRADEMARK OFFICE
CERTIFICATE OF CORRECTION

PATENT NO.    : 6,516,131 B1
DATED         : February 13, 2003
INVENTOR(S)   : Barclay J. Tullis It is certified that error appears in the above-identified patent and that said Letters Patent is hereby corrected as shown below:

Column 15,
Lines 16, 24, 30, 44, 46, 55, 63 and 65, and Column 16, lines 1 and 28, substitute "16" for each occurrence of the claim reference numeral "11".

Column 16,
Line 20, substitute -- said fourth location -- for "said second location".

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,516,131 B1
DATED : February 4, 2003
INVENTOR(S) : Barclay J. Tullis It is certified that error appears in the above-identified patent and that said Letters Patent is hereby corrected as shown below:

Column 3,
Line 11, change "use tapered" to -- use of tapered --;
Line 55, change "apart" to -- a part --.

Column 4,
Line 67, change "S" to -- 5 --.

Column 5,
Line 27, delete ".".

Column 6,
Line 24, change "111" to -- 111 --;
Line 32, delete the first occurrence of "determine";
Line 35, change "ill" to -- 111 --;
Line 44, delete "."after prior.

Column 7,
Line 31, change "6 1" to -- 61 --;
Line 33, change "6" to -- 63 --;
Line 35, change "61 A" to -- 61A --.

Column 8,
Line 8, change "76 than the angle 77" to -- 77 than the angle 76 --, change "70-is" to -- 70 is --.

Column 10,
Line 2, change "100" to -- 100 --;
Line 6, change "(not shown)" to -- 68 (shown in FIG. 4) --;
Line 33, change "328" to -- 329 --;
Line 34, change "323" to -- 333 --;
Line 58, delete "." after "411".

Column 11,
Line 13, delete "is";
Line 15, change "channel 416 than were the channel 416" to -- respective channel than were the channel --;
Line 22, change "strain-induces" to -- strain induces --;
Line 23, insert -- , -- after "fiber";
Line 37, substitute -- are -- for "is".

UNITED STATES PATENT AND TRADEMARK OFFICE
CERTIFICATE OF CORRECTION

PATENT NO. : 6,516,131 B1
DATED : February 4, 2003
INVENTOR(S) : Barclay J. Tullis It is certified that error appears in the above-identified patent and that said Letters Patent is hereby corrected as shown below:

Column 15,
Lines 16, 24, 30, 44, 46, 55, 63 and 65, and Column 16, lines 1 and 28, substitute -- 16 -- for each occurrence of the claim reference numeral "11".

Column 16,
Line 20, substitute -- said fourth location -- for "said second location".

This certificate supersedes Certificate of Correction issued June 10, 2003.

Signed and Sealed this

Nineteenth Day of August, 2003

JAMES E. ROGAN
*Director of the United States Patent and Trademark Office*